US012687661B2

(12) United States Patent (10) Patent No.: US 12,687,661 B2

Kan (45) Date of Patent: Jul. 21, 2026

(54) MULTI-LAYER FILM FOR FOG-FREE MIRROR

(71) Applicant: Chu Hak Kan, Kowloon Bay (HK)

(72) Inventor: Chu Hak Kan, Kowloon Bay (HK)

( * ) Notice: Subject to any disclaimer, the term of this patent is extended or adjusted under 35 U.S.C. 154(b) by 629 days.

(21) Appl. No.: 17/980,873

(22) Filed: Nov. 4, 2022

(65) Prior Publication Data

US 2023/0132760 A1 May 4, 2023

Related U.S. Application Data

(60) Provisional application No. 63/275,697, filed on Nov. 4, 2021.

(51) Int. Cl.
| | |
|---|---|
| *G02B 1/18* | (2015.01) |
| *B32B 7/12* | (2006.01) |
| *B32B 27/08* | (2006.01) |
| *B32B 27/18* | (2006.01) |
| *B32B 27/36* | (2006.01) |
| *B32B 27/40* | (2006.01) |
| *B32B 37/24* | (2006.01) |
| *G02B 1/16* | (2015.01) |

(52) U.S. Cl.
CPC .................. *G02B 1/18* (2015.01); *B32B 7/12* (2013.01); *B32B 27/08* (2013.01); *B32B 27/18* (2013.01); *B32B 27/36* (2013.01); *B32B 27/40* (2013.01); *B32B 37/24* (2013.01); *G02B 1/16* (2015.01); *B32B 2037/243* (2013.01); *B32B 2255/10* (2013.01); *B32B 2307/414* (2013.01); *B32B 2307/416* (2013.01); *B32B 2307/732* (2013.01); *B32B 2367/00* (2013.01)

(58) Field of Classification Search
CPC ... G02B 1/18; G02B 1/16; G02B 1/00; G02B 1/10; G02B 1/14; G02B 27/00; G02B 27/0006; G02B 2207/121; B32B 7/12; B32B 27/08; B32B 27/18; B32B 27/36; B32B 27/40; B32B 37/24; B32B 2037/243; B32B 2255/10; B32B 2307/414; B32B 2307/416; B32B 2307/732; B32B 2367/00; B32B 7/023; B32B 27/00; B32B 37/12; B32B 2307/40; B32B 2307/21; B32B 2307/212
USPC ........................................ 359/514, 507, 513
See application file for complete search history.

(56) References Cited

U.S. PATENT DOCUMENTS

| | | | |
|---|---|---|---|
| 4,467,073 | A | 8/1984 | Creasy |
| 5,402,265 | A | 3/1995 | Jahoda et al. |
| 5,877,254 | A | 3/1999 | La Casse et al. |
| 6,455,142 | B1 | 9/2002 | Herberger et al. |
| 2006/0047064 | A1 | 3/2006 | Murata et al. |
| 2008/0160187 | A1 | 7/2008 | Murata et al. |
| 2011/0170190 | A1 | 7/2011 | Simunic |

FOREIGN PATENT DOCUMENTS

| | | | | |
|---|---|---|---|---|
| CN | 203093204 U | * | 7/2013 | |
| WO | WO-2016070171 A1 | * | 5/2016 | ............. B32B 27/00 |

* cited by examiner

*Primary Examiner* — Arnel C Lavarias
(74) *Attorney, Agent, or Firm* — Fox Rothschild LLP

(57) ABSTRACT

A reflective surface covering includes a reflective substrate and a multi-layer film. The multi-layer film includes a first layer of polyester (PET), a second layer of pressure sensitive adhesive (PSA) or thermally activated acrylic, a third layer of PET, a fourth layer of an anti-fog film, and a fifth layer of polyethylene (PE) acrylic electrostatic protective film.

17 Claims, 1 Drawing Sheet

Protection

Coating A/F

Base Film

Adhesive

Liner

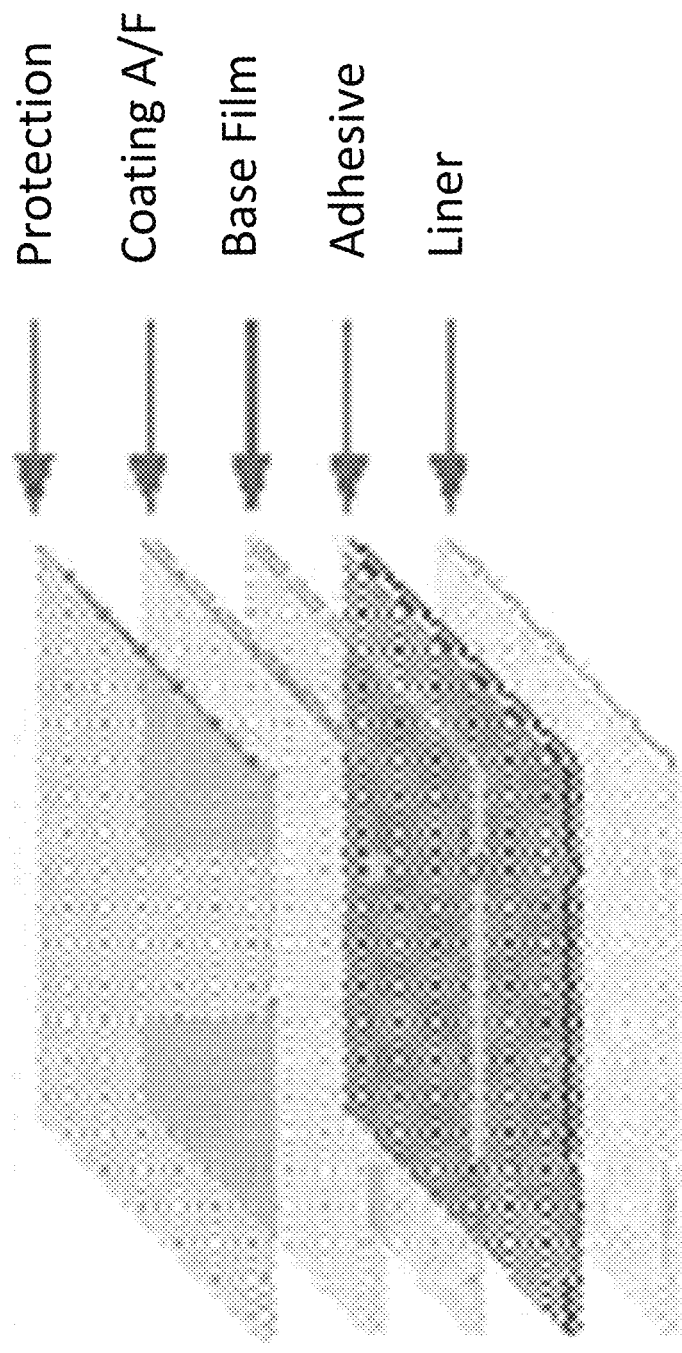

MULTI-LAYER FILM FOR FOG-FREE MIRROR

CROSS REFERENCE TO RELATED APPLICATIONS

The present application is a non-provisional of U.S. Provision Application Ser. No. 63/275,697 entitled Multi-Layer Film for Fog Free Mirror, filed on Nov. 4, 2021. The foregoing application is hereby incorporated by reference in its entirety.

FIELD OF THE INVENTION

The present invention relates generally to mirrors having anti-fog properties. More specifically, the present invention includes a multi-layer film that may be applied to reflective surfaces in order to reduce fogging, wherein the multi-layer film also serves as a protective covering.

BACKGROUND OF THE INVENTION

One common problem associated with mirrors, particularly in bathrooms with showers, steam rooms, and the like, is that they tend to become foggy in humid, steamy environments. Other issues associated with mirrors are that they are often fragile and vulnerable to scratches and abrasions. Various efforts have been made to address these issues. The following documents disclose a non-exhaustive list of such developments, and each of these documents are hereby incorporated herein by reference, in their entireties:

U.S. Pat. No. 9,409,380

Described herein are reflective surface coverings comprising: a reflective substrate; and a multi-layer film comprising: a first thermoplastic polymeric resin layer; a thermally activated adhesive layer; and a second thermoplastic polymeric resin layer; wherein the thickness ratio between the thermally activated adhesive layer and the first thermoplastic polymeric resin layer is from about 1.25:1 to about 2.75:1. Methods of making and using the reflective surface coverings are also described.

U.S. Pat. No. 4,467,073 Transparent Anti-Fog Coating Compositions

An anti-fog liquid coating composition comprises: a polymer which is polyvinylpyrrolidone, polydimethylacrylamide or a polyvinylpyrrolidone copolymer with a polymerizable alpha olefin free of functional groups reactive with isocyanates; a polyisocyanate prepolymer; a surfactant which will chemically bond to a reaction product of the polymer and prepolymer, and an organic solvent to form a solution of the foregoing ingredients. The invention includes a substrate having an anti-fog transparent coating comprising the reaction product of polyvinylpyrrolidone, a polyvinylpyrrolidone copolymer with a polymerizable alpha olefin free of functional groups reactive with isocyanates or polydimethylacrylamide with a polyisocyanate prepolymer, said reaction product being chemically bound to a surfactant. On curing, the surfactant is chemically combined with the hydrophilic polymer/isocyanate prepolymer composition and is not subject to extraction in any significant amount while still conferring improved fog resistance to the coated substrate.

U.S. Pat. No. 5,402,265 Fog-Free Mirror Device

A flexible fog free mirror device for contact attachment and support on a planar surface is disclosed. A three-layered structure includes a first film sheet having an organic coating of anti-fog material on one side. The other side of the sheet has an adhesive coating for laminating the sheet to a first side of a second film sheet. The second side of the second sheet has a reflective metal coating for providing a mirrored finish. The reflective metal coating is laminated to a first side of a cling vinyl film sheet. The vinyl sheet enables the three-layer structure to contact adhere to the planar surface. In an alternate embodiment, a two-layered structure includes the first film sheet and the second film sheet for releasable attachment to an existing mirrored surface. The first film sheet has the organic coating of anti-fog material coated on the one side, the other side of which is coated with a pressure sensitive adhesive. The first side of the second film sheet has a release coating of silicone compound so that the second film sheet may be stripped from the first film sheet to expose the pressure sensitive adhesive layer. As such, the first film sheet may be adhered to the mirrored surface whereby the mirrored surface remains fog-free in a high humidity environment. A printed indicia is included on the other side of the first film sheet.

U.S. Pat. No. 5,877,254 Scratch Resistant Anti-Fog Coating Composition Incorporating Isocyanate-Reactive Surfactants Anti-fog and scratch resistant polyurethane compositions are disclosed which include an isocyanate prepolymer, a hydrophilic polyol and an isocyanate-reactive surfactant. The reaction product of the component produces enhanced properties having permanent anti-fog and scratch-resistant characteristics. These compositions may be used as coatings, films and self-supporting articles. Plastic substrates coated with these compositions may be subsequently subjected to thermoforming, such as molding and shaping, without loss of their properties.

U.S. Pat. No. 6,455,142 Anti-Fog Coating and Coated Film

The present invention provides a coated polymer film having an essentially streak-free coated surface that resists the formation of fog. The film includes a self-supporting polymer film layer, and an anti-fog coating on the film layer. The anti-fog coating, which can also be applied to alternate substrates, consisting essentially of a copolyester binder and an anionic surfactant, wherein the surfactant contains less than about 0.5 weight percent of a fluorosurfactant. A slip agent can also be included in the anti-fog coating.

U.S. Application No. 20060047064 Coating Agent for Forming Antifogging Film and Method for Forming Antifogging Film Using Same The invention relates to a two-package coating agent for forming an antifogging film. This coating agent contains a first coating agent comprising an isocyanate containing an isocyanate group; and a second coating agent comprising (a) a polyol component comprising at least a water-absorbing polyol and a hydrophobic polyol and (b) a surfactant comprising a group that is reactive with the isocyanate group. It is possible to form an antifogging film by a method including the steps of mixing the first and second coating agents together to prepare a coating agent; applying the coating agent to the substrate to form a precursory film on the substrate; and hardening the precursory film under room temperature or heating into the antifogging film.

U.S. Application No. 20080160187 Antifog Article. Method for Producing Same, and Coating Material for Forming Antifog Coating Film The present invention relates to a coating agent for forming an antifogging film on a substrate. This coating agent is formed of a solvent and a mixture containing:

(A) an organic isocyanate;
 (B) a water-absorbing polyol;
 (C) an acryl polyol; and (D) a surface active agent having an active hydrogen group.

U.S. Application No. 20110170190 Fog Resistant Mirror

The present development is a fog-resistant mirror. The mirror comprises a glass plate having a reflective surface on one side and an anti-fog coating on the opposing side. In a preferred embodiment, the anti-fog coating comprises two material layers: a primer coat layer applied directly to the glass plate, and a top coat applied to the primer coat layer, wherein the top coat comprises a chemical material known to resist fogging.

BRIEF SUMMARY OF THE INVENTION

In accordance with one aspect of the invention, a first embodiment of a multi-layer film that may be applied to a mirror or other reflective surface includes a first layer of PET (polyethylene terephthalate or polyester), a second layer of PSA (pressure sensitive adhesive) acrylic, a third layer of PET transparent substrate, a fourth layer which is a chemical mixed coating, and a fifth layer of PE (polyethylene) acrylic electrostatic protective film.

The multi-layer film is preferably transparent, and provides several desirable properties, including anti-fogging properties, easy cleaning with alcohol wipes and the like, high adhesive adhesion, high temperature and humidity resistance, and no residual glue. Although primarily used on mirror surfaces, the multi-layer film may also be applied to medical devices, camera lenses, anti-fog glasses, anti-fog masks, freezers, display cabinets, glass doors and many other products and substrates.

BRIEF DESCRIPTION OF THE DRAWINGS

These and other features, aspects, and advantages of the present invention will become better understood with regard to the following description, appended claims, and accompanying drawings where:

FIG. 1 is an exploded view of one embodiment of a multi-layer film that may be applied to a mirror or reflective surface, wherein the multi-layer film includes a first layer of PET (polyester), a second layer of PSA (pressure sensitive adhesive) acrylic, a third layer of PET transparent substrate, a fourth layer of which is a chemical mixed anti-fog coating and a fifth layer of PE (polyethylene) acrylic electrostatic protective film.

DETAILED DESCRIPTION OF THE INVENTION

Overview

Generally, the present invention provides a reflective surface covering comprising: a reflective substrate; and a multi-layer film comprising: a first thermoplastic polymeric resin layer; a thermally activated adhesive layer; and a second thermoplastic polymeric resin layer; and an anti-fog coating. The thickness of the adhesive layer is preferably linked to the thickness of the anti-fog coating. For example, if the anti-fog coating layer has a maximum thickness of about 12 µm, then the thickness ratio between the thermally activated adhesive layer and the anti-fog coating layer is preferably from about 0.66:1. Alternatively, if the thickness of the adhesive layer is a minimum of 8 µm and the anti-fog coating layer has a maximum thickness of 10 µm, then the thickness ratio between the adhesive layer and the anti-fog coating is about 1:1.

| Classification | Unit | For Bath | Remark | Thickness Ratio |
|---|---|---|---|---|
| Protection | µm | 45 ± 5 | | |
| Anti fog coating | µm | 11 ± 1 | AF | 1 |
| Base Film | µm | 100 ± 5 | PET | |
| Adhesive | µm | 9 ± 1 | ACR | 0.8~0.83 |
| Liner | µm | 50 ± 2 | | |
| Total | µm | 215 ± 14 | | |

Multi-Layer Film Structure

The present invention includes, in a first embodiment, a multi-layer film that may be applied to a mirror or other reflective surface. The multi-layer film includes a first layer of PET (polyethylene terephthalate or polyester—also referred to herein as the 'first polymeric resin layer') preferably having a thickness in the range of 48 and 52 µm, a second layer of PSA (pressure sensitive adhesive) or thermally activated acrylic preferably having a thickness in the range of 8 and 10 µm, a third layer of PET transparent substrate (also referred to herein as the 'second polymeric resin layer') preferably having a thickness in the range of 95 and 105 µm, a fourth layer of an anti-fog film, which is preferably a chemical mixed coating preferably having a thickness in the range of 10 and 12 µm, and a fifth layer of PE (polyethylene) acrylic electrostatic protective film, which preferably has a thickness in the range of 40 and 50 µm.

The anti-fog layer may be a film or coating. Some examples of anti-fog compositions include a polymer which is polyvinylpyrrolidone, polydimethylacrylamide or a polyvinylprrolidone copolymer with a polymerizable alpha olefin free of functional groups reactive with isocyanates; a polyisocyanate prepolymer; a surfactant which will chemically bond to a reaction product of the polymer and prepolymer, and an organic solvent to form a solution of the foregoing ingredients. Other examples include substrates having an anti-fog transparent coating comprising the reaction product of polyvinylpyrrolidone, a polyvinylpyrrolidone copolymer with a polymerizable alpha olefin free of functional groups reactive with isocyanates or polydimethylacrylamide with a polyisocyanate prepolymer, said reaction product being chemically bound to a surfactant. Both non-ionic and anionic surfactants may be used in the same coating composition to good effect. In another embodiment, the anti-fog coating consists essentially of a copolyester binder and an anionic surfactant, wherein the surfactant contains less than about 0.5 weight percent of a fluorosurfactant. Another example of an antifogging film may include a two-package coating agent for forming an antifogging film. This coating agent contains a first coating agent comprising an isocyanate containing an isocyanate group; and a second coating agent comprising (a) a polyol component comprising at least a water-absorbing polyol and a hydrophobic polyol and (b) a surfactant comprising a group that is reactive with the isocyanate group. It is possible to form an antifogging film by a method including the steps of mixing the first and second coating agents together to prepare a coating agent; applying the coating agent to the substrate to form a precursory film on the substrate; and hardening the precursory film under room temperature or heating into the antifogging film. Other types of anti-fogging films, coatings and agents are described and disclosed in the above-referenced patent documents (patents and published applications), all of which are incorporated herein by reference, in their entireties. Similarly, anti-fog films, coatings and agents are commercially available worldwide, and any suitable anti-fog films, coatings or agents may be used. One particularly preferred Anti-Fog film is commercially manufactured and sold by SEWHA P&C Co., Ltd.

Other types of thermoplastic resins may be used, as well, in place of the first layer of PET and the third layer of PET. For example, polyurethane or a polyurethane based layer may be used, and may include a hydrophilic polymer, an isocyanate prepolymer with free isocyanate groups, an organic solvent solution of a hydrophilic polyol and a surfactant having isocyanate-reactive functionality. One example of suitable polyurethane based layers may be found in U.S. Pat. No. 5,877,254, which is also incorporated herein by reference.

It should be understood that different embodiments may have a different configuration of layers with respect to one another. For some versions of the present invention, each layer of the multi-layer film has a particular arrangement. In some embodiments, the first thermoplastic polymeric resin layer is positioned between the thermally activated adhesive layer and the second thermoplastic polymeric resin layer. In those embodiments wherein the multi-layer film further comprises a protective layer, the protective layer is adjacent to the second thermoplastic polymeric resin layer. In other embodiments wherein the multi-layer film further comprises a protective layer, there may be no intervening layers between the protective layer and the second thermoplastic polymeric resin layer.

In certain embodiments, the second thermoplastic polymeric resin layer forms the top surface of the multi-layer film. In those embodiments wherein the multi-layer film comprises a protective layer, the protective layer preferably forms the top surface of the multi-layer film.

It is also contemplated that the first thermoplastic polymeric resin layer may be positioned between the thermally activated adhesive layer and the second thermoplastic polymeric resin layer. Optionally, the first thermoplastic polymeric resin layer may be positioned between the thermally activated adhesive layer and the second thermoplastic polymeric resin layer, such that there are no intervening layers between the first thermoplastic polymeric resin layer and the second thermoplastic polymeric resin layer or any intervening layers between the first thermoplastic polymeric resin layer and the thermally activated adhesive layer.

In certain embodiments, each layer of the anti-fog complex has a particular arrangement. In some embodiments, the first thermoplastic polymeric resin layer is positioned between the thermally activated adhesive layer and the second thermoplastic polymeric resin layer of the anti-fog complex. In some embodiments, the second thermoplastic polymeric resin layer forms the top surface of the anti-fog complex. Optionally, the anti-fog complex may include no intervening layers between the first thermoplastic polymeric resin layer and the thermally activated adhesive layer. It is also foreseen that the anti-fog complex may include no intervening layers between the first thermoplastic polymeric resin layer and the second thermoplastic polymeric resin layer. In some embodiments, the anti-fog complex does not contain any intervening layers between the first thermoplastic polymeric resin layer and the second thermoplastic polymeric resin layer or any intervening layers between the first thermoplastic polymeric resin layer and the thermally activated adhesive layer.

The invention will be described in greater detail by way of specific examples. The following examples are offered for illustrative purposes and are not intended to limit the invention in any manner. Those skilled in the art will readily recognize a variety of noncritical parameters, which can be changed or modified to yield essentially the same results.

Example 1

Performance Indicators:

| | The Project | Unit No | Specifications | Detection value | Test die method |
|---|---|---|---|---|---|
| Thickness | PE film | μm | 40 ± 3 | 40 | ASTM D374 |
| | PET substrate | | 100 ± 3 | 100 | |
| | Anti-fog layer + PET substrate + PSA | | 120 ± 5 | 121 | |
| | PET discrete membrane | | 50 ± 3 | 50 | |
| The PSA-layer stripping force (For the SUS, 180° 300 mm/min | Initial value | N/25 mm | >10 | >10 | ASTM D3330 |
| | After the high temperature and the high humidity | N/25 mm | >10 | >10 | |
| Fog degree | | % | ≤4 | 1.41 | ASTM D1003 |
| Light transmittance | | | ≥89 | 91.43 | |
| Anti-fog nature | | / | For 20 times | Qualified | The 100° C. boiling water test |
| Apables | | | | Qualified | |

Note
1, High temperature and high wet conditions: 60° C. 90% RH 72 hours.
The 2, can adjust the substrate thickness and rubber layer stripping force according to the customer requirements.

meric resin layer, such that there are no intervening layers between the first thermoplastic polymeric resin layer and the thermally activated adhesive layer. Alternatively, the first thermoplastic polymeric resin layer may be positioned between the thermally activated adhesive layer and the second thermoplastic polymeric resin layer, such that there are no intervening layers between the first thermoplastic polymeric resin layer and the second thermoplastic poly- Manufacturing Method In one embodiment, a method of preparing a reflective surface covering comprises: a) providing a reflective substrate and a multi-layer film comprising: a protective layer; and an anti-fog complex comprising: a first thermoplastic polymeric resin layer; a thermally activated adhesive layer; a second thermoplastic polymeric resin layer; b) laminating the multi-layer film and the reflective substrate together to form a laminated composite; c) maintaining the laminated composite in ambient conditions for a time sufficient to permit solidification of the multi-layer film; d) removing the protective layer from the laminated composite to expose the anti-fog complex; and e) performing a post-lamination cleaning cycle. In some embodiments, the multi-layer film and the reflective substrate are laminated together at a pressure of from about 0.66 pounds per square inch (psi) to about 1.54 psi.

One example of the manufacturing process involves the following steps: 1) providing a sheet of PET material and adding an anti-fog solvent coating with micro gravure onto a first side of the PET material, and thermally curing the coated PET material with the anti-fog solvent; 2) adding an acrylic adhesive on the second side (the opposite side of the anti-fog solvent coating) of the PET sheet, and thermally curing the composite; 3) attaching a PET release film to the acrylic adhesive side; 4) attaching a metallocene protection film to the anti-fog coating; and 5) winding the resulting composite film onto a plastic tube. The rolled film may then be applied in a separate process to a mirror or other reflective surface.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A reflective surface covering comprising:
a reflective substrate; and
a multi-layer film comprising:
a first layer of thermoplastic resin;
a layer of thermally activated adhesive;
a second layer of thermoplastic resin;
a layer of an anti-fog film; and
a layer of polyethylene acrylic electrostatic protective film.

2. The reflective surface covering set forth in claim 1, wherein said first layer of thermoplastic resin has a thickness in a range of 48 and 52 μm.

3. The reflective surface covering set forth in claim 1, wherein said layer of adhesive has a thickness in a range of 8 and 10 μm.

4. The reflective surface covering set forth in claim 1, wherein said second layer of polymeric resin includes a thickness in a range of 95 and 105 μm.

5. The reflective surface covering set forth in claim 1, wherein said layer of anti-fog film has a thickness in a range of 10 and 12 μm.

6. The reflective surface covering set forth in claim 1, wherein said layer of polyethylene acrylic electrostatic protective film has a thickness in a range of 40 and 50 μm.

7. The reflective surface covering set forth in claim 1, wherein said first layer of thermoplastic resin is selected from the group consisting of polyethylene terephthalate and polyurethane.

8. The reflective surface covering set forth in claim 7, wherein said first layer of thermoplastic resin includes at least one additive selected from the group consisting of a hydrophilic polymer, an isocyanate prepolymer with free isocyanate groups, an organic solvent solution of a hydrophilic polyol, and a surfactant having isocyanate-reactive functionality.

9. The reflective surface covering set forth in claim 1, wherein said second layer of thermoplastic resin is selected from the group consisting of polyethylene terephthalate and polyurethane.

10. The reflective surface covering set forth in claim 9, wherein said second layer of thermoplastic resin includes at least one additive selected from the group consisting of a hydrophilic polymer, an isocyanate prepolymer with free isocyanate groups, an organic solvent solution of a hydrophilic polyol, and a surfactant having isocyanate-reactive functionality.

11. The reflective surface covering set forth in claim 1, wherein said first layer of thermoplastic resin is positioned between said thermally activate adhesive layer and the second layer of thermoplastic resin.

12. The reflective surface covering set forth in claim 1, wherein said second layer of thermoplastic resin forms a top surface of the multi-layer film.

13. The reflective surface covering set forth in claim 1, wherein said layer of polyethylene acrylic electrostatic protective film forms a top surface of the multi-layer film.

14. The reflective surface covering set forth in claim 1, wherein the layer of polyethylene acrylic electrostatic protective film is adjacent to the second layer of thermoplastic resin.

15. The reflective surface covering set forth in claim 14, wherein the layer of polyethylene acrylic electrostatic protective film is adjacent to the second layer of thermoplastic resin such that there are no intervening layers between the layer of polyethylene acrylic electrostatic protective film and the second layer of thermoplastic resin.

16. The reflective covering set forth in claim 1, wherein the layer of polyethylene acrylic electrostatic protective film is adjacent to the layer of anti-fog coating.

17. The reflective covering set forth in claim 1, wherein the layer of polyethylene acrylic electrostatic protective film includes metallocene.

* * * * *